United States Patent

Brandenstein et al.

[11] Patent Number: 6,142,675
[45] Date of Patent: Nov. 7, 2000

[54] ROLLER HAVING SPINDLE FIXED TO INNER BEARING RING

[75] Inventors: Manfred Brandenstein, Eussenheim; Josef Stork, Gerolzhofen, both of Germany

[73] Assignee: SKF GmbH, Schweinfurt, Germany

[21] Appl. No.: 09/275,818

[22] Filed: Mar. 25, 1999

[30] Foreign Application Priority Data

Mar. 27, 1998 [DE] Germany ............... 298 05 581 U

[51] Int. Cl.[7] .................................................. B60B 33/00
[52] U.S. Cl. ........................... 384/537; 384/581; 384/584
[58] Field of Search .................... 384/537, 546, 384/547, 584, 585, 581, 582, 535, 536

[56] References Cited

U.S. PATENT DOCUMENTS

| | | | |
|---|---|---|---|
| 3,909,083 | 9/1975 | Vahle | 384/537 X |
| 3,936,099 | 2/1976 | Braun et al. | 308/15 |
| 4,489,992 | 12/1984 | Brandenstein et al. | 384/536 X |
| 4,557,708 | 12/1985 | Brandenstein et al. | 474/112 |
| 4,652,152 | 3/1987 | Brandenstein et al. | 384/536 X |
| 4,758,101 | 7/1988 | Roof, Sr. et al. | 384/537 |
| 4,795,280 | 1/1999 | Dobhan et al. | 384/539 |
| 4,848,938 | 7/1989 | Haas et al. | 384/537 |
| 5,062,721 | 11/1991 | Chiba | 384/536 |
| 5,425,584 | 6/1995 | Ide | 384/581 X |
| 5,836,702 | 11/1998 | Whiddon et al. | 384/584 |
| 6,007,252 | 12/1999 | Thelen et al. | 384/535 |

FOREIGN PATENT DOCUMENTS 0 712 708  5/1996  European Pat. Off. .

*Primary Examiner*—Khoi Q. Ta
*Attorney, Agent, or Firm*—Burns, Doane, Swecker & Mathis, L.L.P.

[57] ABSTRACT

A roller includes a rolling bearing having inner and outer rings, a roller shell formed of injection molding material and molded in a form-fitting manner onto the outer ring of the roller bearing, and a spindle disposed in the bore of the inner ring with a space being provided between the surface of the bore and the spindle. The spindle includes at least one form-fitting element. An injection molding material forms a filler in the space between the spindle and the bore surface, whereby the outside contour of the spindle is constructed as am outer shaping surface for the form tool. A method of producing a roller involves placing a rolling bearing having inner and outer rings into a form tool, placing a spindle in the form tool so that the spindle extends into the bore in the inner ring and is held in place in the form tool, closing the form tool, and injecting molding material into the form tool. The molding material flows into a space provided between the inner surface of the form tool and the outer surface of the outer ring to form a roller shell of the molding material that is molded in a form-fitting manner onto the outer ring of the rolling bearing. The molding material also flows into a space that exists between the inner surface of the bore and the outer surface of the spindle to fix the spindle relative to the inner ring.

10 Claims, 1 Drawing Sheet

ROLLER HAVING SPINDLE FIXED TO INNER BEARING RING

This application corresponds to and claims priority under 35 U.S.C. § 119 with respect to German Application No. G 298 05 581.3 filed on Mar. 27, 1998, the entire content of which is incorporated herein by reference.

FIELD OF THE INVENTION

The present invention generally relates to a roller. More particularly, the present invention pertains to a roller that includes a rolling bearing, a roller shell and a spindle.

BACKGROUND OF THE INVENTION

EP 0 712 708 describes setting a rolling bearing into a form tool to produce a roller outer surface by injection molding. Both the bore of the rolling bearing and the bearing chamber are covered on both sides by the form tool and an auxiliary shaping part. The outer surface of the outer ring thereby forms a molding surface. The roller shell wraps around the outer ring up to the area of the side surfaces. This results in an axially form-fitting fixation.

If the roller is supposed to be mounted with a spindle, the spindle must be inserted and axially secured later in the work process. During insertion of the spindle, the tolerances of the inner ring bore must be taken into account if the attachment is realized by pushing the spindle into the inner ring bore. Other types of attachment to axially secure the spindle are possible, but they are complicated and not very cost-efficient.

In light of the foregoing, a need exists for a roller that can be produced at relatively small cost with a spindle without having to take into consideration the tolerances of the rolling bearing and without having to engage in complicated and costly procedures.

SUMMARY OF THE INVENTION

In accordance with the present invention, a spindle with form-fitting elements is arranged in the bore of the inner ring, and one or more free spaces between the spindle and the bore surface hold a filler of injection molding material, whereby the outside contour of the spindle is constructed as a shaping surface for the form tool because it determines the inner shape which the injected material will obtain.

By inserting the rolling bearing and the prefabricated spindle before the injection molding process, a finished roller is produced. Since the inner ring is not radially loaded, and the dimension of the bore does not change the quality of attachment, the production of rolling bearings with greater tolerances is possible.

According to one aspect of the invention, a roller includes a rolling bearing having an inner ring and an outer ring, with the inner ring being provided with a bore, and a roller shell formed of an injection molding material and molded in a form-fitting manner onto the outer ring of the rolling bearing. A spindle is disposed in the bore of the inner ring with a space being provided between the bore surface and the spindle. The spindle is provided with at least one form-fitting element between the spindle and the bore surface of the bore of the inner ring. An injection molding material forms a filler in the space between the spindle and the bore surface of the bore, whereby an outside contour of the spindle is constructed as a shaping surface for the form tool.

According to another aspect of the invention, a roller includes a rolling bearing having an inner ring and an outer ring, with the inner ring being provided with a bore having a bore surface, and a roller shell formed of an injection molding material and molded in a form-fitting manner onto the outer ring of the rolling bearing. A spindle is disposed in the bore of the inner ring so that a space exists between the outer surface of the spindle and the bore surface of the bore in the inner ring. An injection molding material is located in the space between the outer surface of the spindle and the bore surface of the bore to fix the spindle relative to the inner ring.

Another aspect of the present invention involves a method of forming a roller. The method includes placing a rolling bearing having an inner ring and an outer ring into a form tool, with the inner ring being provided with a bore and the form tool being configured so that a space exists between the inner surface of the form tool and the outer surface of the outer ring. A spindle is placed in the form tool so that the spindle extends into the bore in the inner ring and is held in place in the form tool with a space between the inner surface of the bore and the outer surface of the spindle. After closing the form tool, molding material is injected into the form tool, with the molding material flowing into the space between the inner surface of the form tool and the outer surface of the outer ring to produce a roller shell of the molding material that is molded in a form-fitting manner onto the outer ring of the rolling bearing, and with the molding material flowing into the space between the inner surface of the bore and the outer surface of the spindle to fix the spindle with respect to the inner ring.

BRIEF DESCRIPTION OF THE DRAWING FIGURES

The foregoing and additional features and characteristics of the present invention will become more readily apparent from the following detailed description considered with reference to the accompanying drawing figures in which like elements are designated by like reference numerals and wherein:

FIG. 1 is a partial longitudinal cross-sectional view of a roller with a molded-in spindle when the form tool is open; and FIG. 2 is a partial cross-sectional view in the axial area of the rolling bearing.

DETAILED DESCRIPTION OF THE INVENTION

Figure 1:
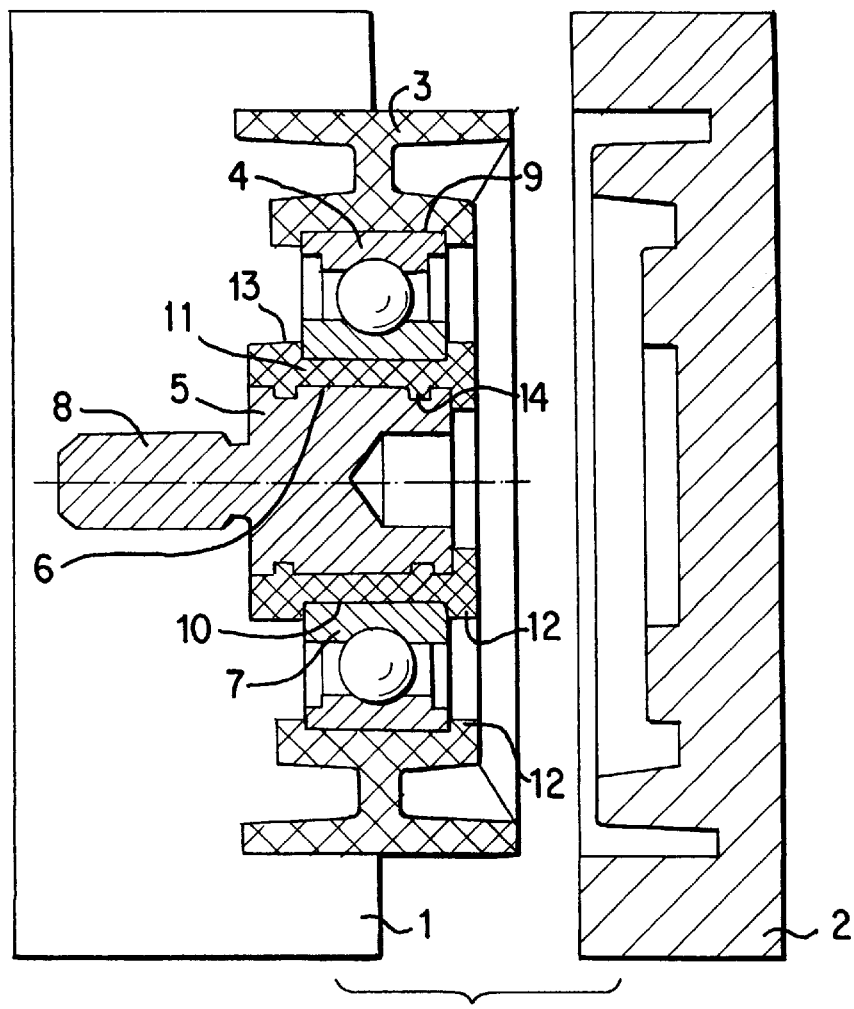

The roller or ball bearing shown in FIG. 1 is adapted to be produced using a form tool having two halves 1, 2. The roller is illustrated in FIG. 1 as still being located in one-half 1 of the form tool. The other half 2 of the form tool is illustrated as having been axially removed after the injection molding process. The ball bearing or roller includes an outer ring 4 and an inner ring 7. The form tool illustrated in FIG. 1 is used to shape a roller shell 3 around the outer ring 4 of the ball bearing and for providing a filler 11 for fixedly securing a spindle 5 in the bore 6 of the inner ring 7.

The half of the form tool 1 shown on the left in FIG. 1 is provided with a central setting bore 8 for holding and centering the spindle 5. The outer surface of the spindle 5 is provided with one or more grooves 14 that may be annular in shape. The ball bearing 4, 7 is also inserted in the left half of the form tool, and is centered precisely by a projection that is not specifically shown. When the two halves of the form tool 1, 2 are closed, the outer surface 9 of the outer ring 4, the inner bore surface 6 of the inner ring 7, and the outside contour 10 of the spindle 5 form complementary form surfaces which later assume the function of securing and positioning the parts relative to each other. In addition, an empty or free space exists between the inner surface of the form tool 1 and the outer surface of the outer ring 4 for forming the roller shell 3, and an empty or free space exists between the outer surface of the spindle 5 and the inner surface of the inner ring 7 for forming the filler 11.

After the halves 1, 2 of the form tool are closed, injection molding material is injected into the form tool by way of injection channels arranged in a standard arrangement. As a result, both the empty space between the inner surface of the form tool 1 and the outer surface of the outer ring 4, and the empty space between the outer surface of the spindle 5 and the inner surface of the inner ring 7, are filled with the injection molding material. Thus, after the injection process, the roller shell 3 and the filler 11 are formed.

Both the roller shell 3 and the filler 11 extend with flange-shaped projections 12 beyond the axial end surfaces 13 of the inner and outer bearing races 4, 7 so that an axial form fit is present on both axial ends of the inner and outer bearing races 4, 7. The projections 12 extend radially as seen in FIG. 1 to thus provide the axial form fit. A form fit is also advantageously provided by the annular grooves 14 in the spindle 5 which are filled during the injection molding process. The annular grooves 14 thus serve as form-fitting elements.

In this way, a roller or ball bearing is produced that is already operable after it is removed from the form tool. The roller or ball bearing is characterized by a form-fitting fixation of the components relative to each other on all sides and with an excellent dimensional quality, in particular in relation to the rotational sense of the roller.

Figure 2:
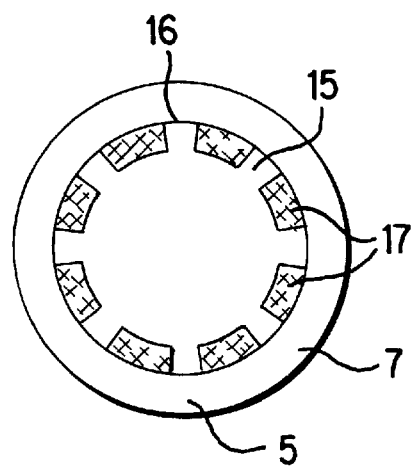

FIG. 2 shows an alternative spindle 5 configuration. Here, the spindle 5 is provided with radially outwardly directed projections or spokes 15 arranged in a star shape manner. Defined between each pair of adjacent projections 15 is an axially extending groove. The peripheral surfaces 16 of the projections 15 rest, while complying with all tolerances and without press fit, on the inner bore surface 6 of the inner ring 7 to prevent deformation.

During the injection molding process, the injection molding material flows into the spaces or axially extending grooves between the projections 15 to produce several spaced apart filler sections 17, each bordered on opposite sides by the projections 15. Each of the filler sections 17 terminates at both ends in flange-shaped projections 12 in the manner shown in FIG. 1. The projections 12 thus provide an axial form fit. A form fit fixation is also provided between the spindle 5 and the inner ring 7 by virtue of the filler sections 17 in the grooves that serve as form-fitting elements.

The projections 15 only avoid or inhibit a radial support via a relatively thick injection molding material layer, as in FIG. 1 for example. In the absence of the projections 15, the relatively thick injection molding material would act as a radial support which is somewhat undesirable as this layer has relatively poor dimensional stability compared to a metal layer. As the layer thickness in the area of the projections approaches zero, the radial support is performed by the projections which have a higher dimensional stability.

The principles, preferred embodiments and mode of production of the present invention have been described in the foregoing specification. However, the invention which is intended to be protected is not to be construed as limited to the particular embodiments described. The embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A roller comprising:
    a rolling bearing having an inner ring and an outer ring, the inner ring being provided with a bore having a bore surface;
    a roller shell formed of an injection molding material and molded in a form-fitting manner onto the outer ring of the rolling bearing;
    a spindle disposed in the bore of the inner ring with a space being provided between the bore surface and the spindle, said spindle including at least one form-fitting element between the spindle and the bore surface of the bore of the inner ring; and
    an injection molding material forming a filler in the space between the spindle and the bore surface of the bore, whereby an outside contour of the spindle forming a shaping surface for the filler.

2. The roller as claimed in claim 1, wherein said at least one form-fitting element includes a plurality of form-fitting elements formed between projections that extend outwardly from the spindle in a star shape pattern.

3. The roller as claimed in claim 2, wherein said projections contact the bore surface of the bore in the inner ring.

4. The roller as claimed in claim 1, wherein the filler possesses radially extending form-fitting elements that engage axial end surfaces of the inner ring.

5. The roller as claimed in claim 1, wherein said at least one form-fitting element is defined by at least one annular groove formed in an outer surface of the spindle.

6. A roller comprising:
    a rolling bearing having an inner ring and an outer ring, the inner ring being provided with a bore having a bore surface;
    a roller shell formed of an injection molding material and molded in a form-fitting manner onto the outer ring of the rolling bearing;
    a spindle disposed in the bore of the inner ring, said spindle possessing an outer surface, a space being provided between the outer surface of the spindle and the bore surface of the bore in the inner ring; and
    an injection molding material located in the space between the outer surface of the spindle and the bore surface of the bore to fix the spindle relative to the inner ring.

7. The roller as claimed in claim 6, wherein said spindle includes a plurality of outwardly directed projections defining a plurality of form-fitting elements each located between adjacent pairs of projections, said injection molding material filling said form-fitting elements.

8. The roller as claimed in claim 7, wherein said projections contact the bore surface of the bore in the inner ring.

9. The roller as claimed in claim 6, wherein the injection molding material includes radial form-fitting elements that engage axial end surfaces of the inner ring.

10. The roller as claimed in claim 6, wherein said spindle includes at least one annular groove formed in the outer surface of the spindle to define a form-fitting element, said injection molding material filling said form-fitting element.

* * * * *